No. 766,567. PATENTED AUG. 2, 1904.
J. P. WRIGHT.
MATCH MAKING MACHINE.
APPLICATION FILED DEC. 31, 1897.
NO MODEL. 12 SHEETS—SHEET 1.

Witnesses:
Jas. E. Hutchinson
F. P. Prindle

Inventor.
Jacob P. Wright
by Prindle & Russea
his Attorney

No. 766,567. PATENTED AUG. 2, 1904.
J. P. WRIGHT.
MATCH MAKING MACHINE.
APPLICATION FILED DEC. 31, 1897.
NO MODEL. 12 SHEETS—SHEET 5.

No. 766,567. PATENTED AUG. 2, 1904.
J. P. WRIGHT.
MATCH MAKING MACHINE.
APPLICATION FILED DEC. 31, 1897.
NO MODEL. 12 SHEETS—SHEET 6.

Witnesses:
Jas. E. Hutchinson.
Frank P. Prindle.

Inventor.
Jacob P. Wright
by Prindle & Russell
his Attorneys

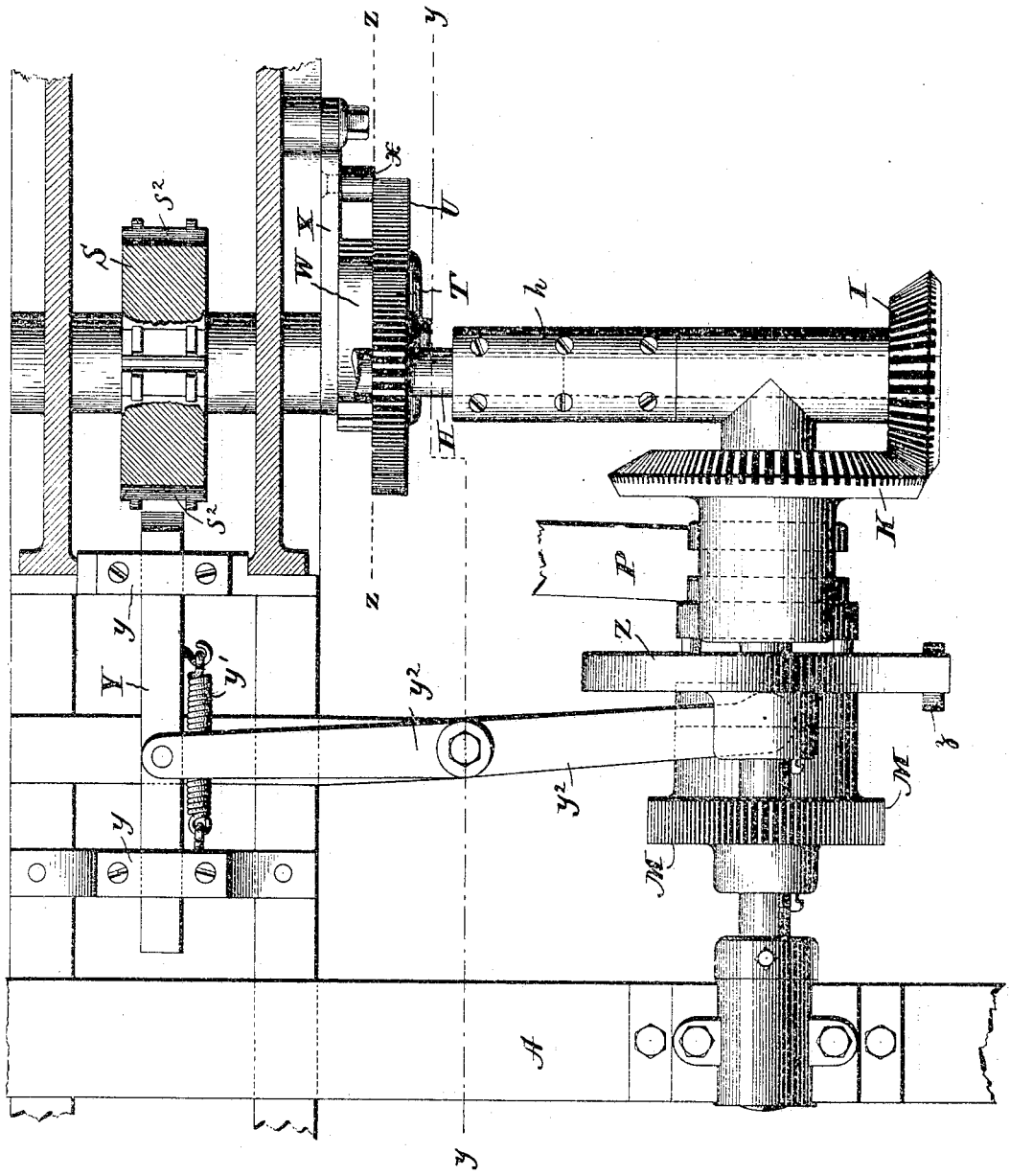

No. 766,567. PATENTED AUG. 2, 1904.
J. P. WRIGHT.
MATCH MAKING MACHINE.
APPLICATION FILED DEC. 31, 1897.
NO MODEL. 12 SHEETS—SHEET 8.
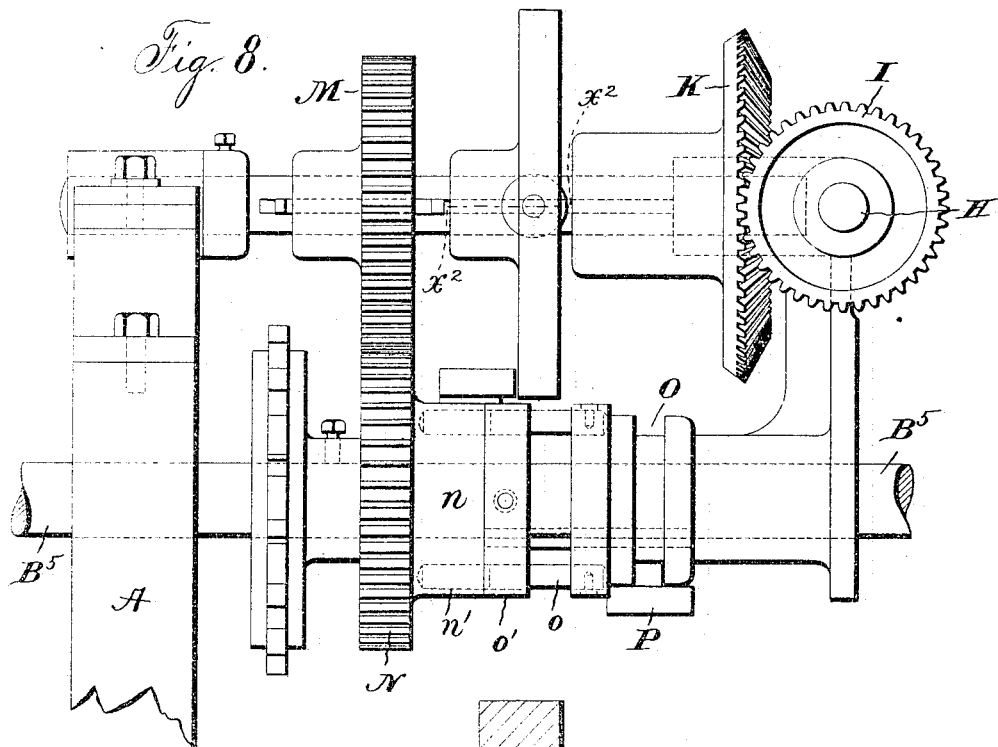
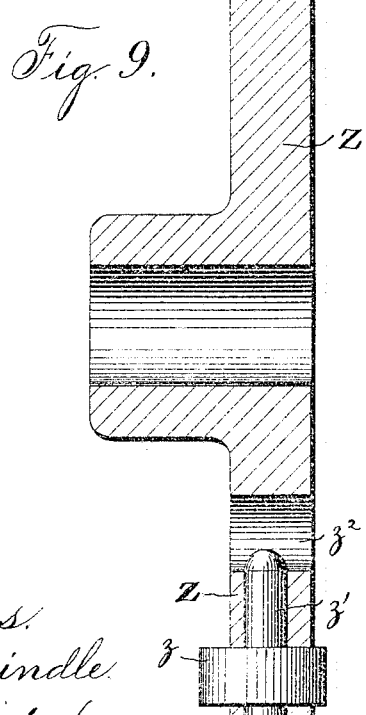
Witnesses
Frank P. Prindle
Jas. E. Hutchinson
Inventor
Jacob P. Wright
by Prindle & Russell
his Attorneys No. 766,567. PATENTED AUG. 2, 1904.
J. P. WRIGHT.
MATCH MAKING MACHINE.
APPLICATION FILED DEC. 31, 1897.
NO MODEL. 12 SHEETS—SHEET 9.
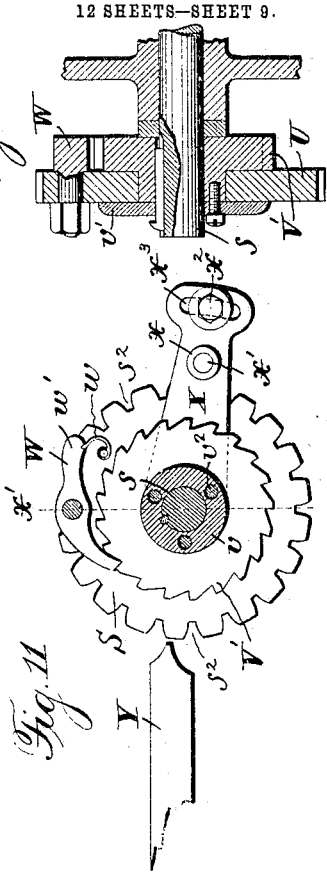
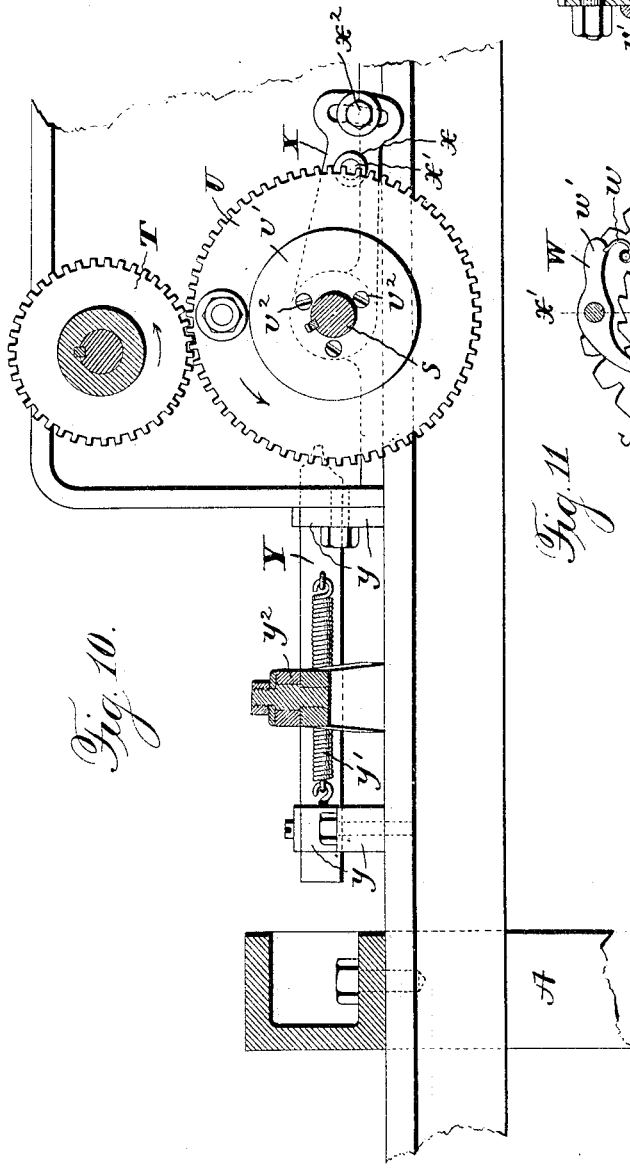
Witnesses:
Jas. E. Hutchinson.
Frank P. Prindle.
Inventor
Jacob P. Wright
by Prindle & Russell
his Attorneys No. 766,567. PATENTED AUG. 2, 1904.
J. P. WRIGHT.
MATCH MAKING MACHINE.
APPLICATION FILED DEC. 31, 1897.
NO MODEL. 12 SHEETS—SHEET 10.
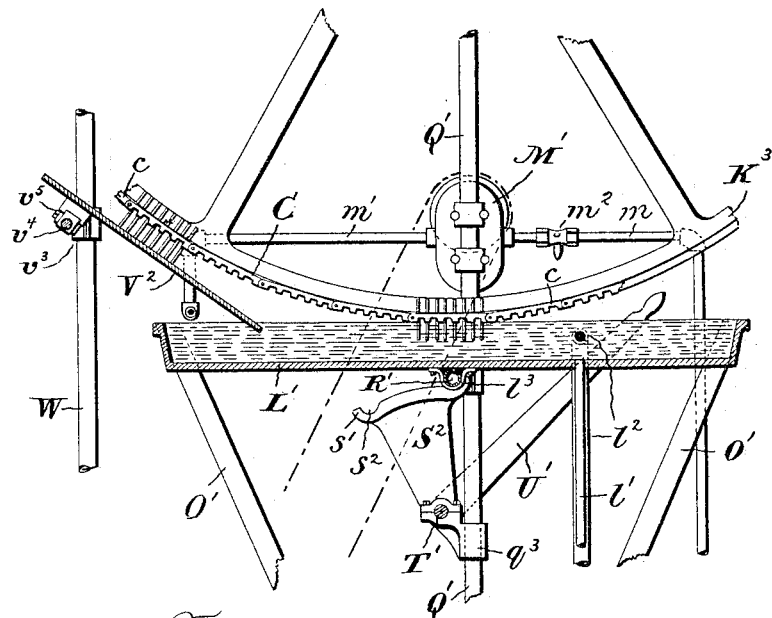
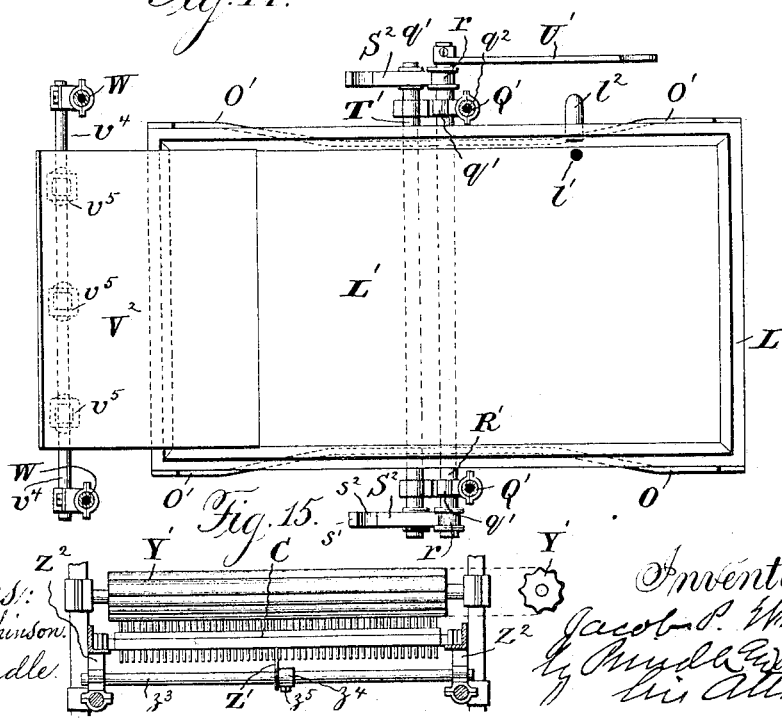

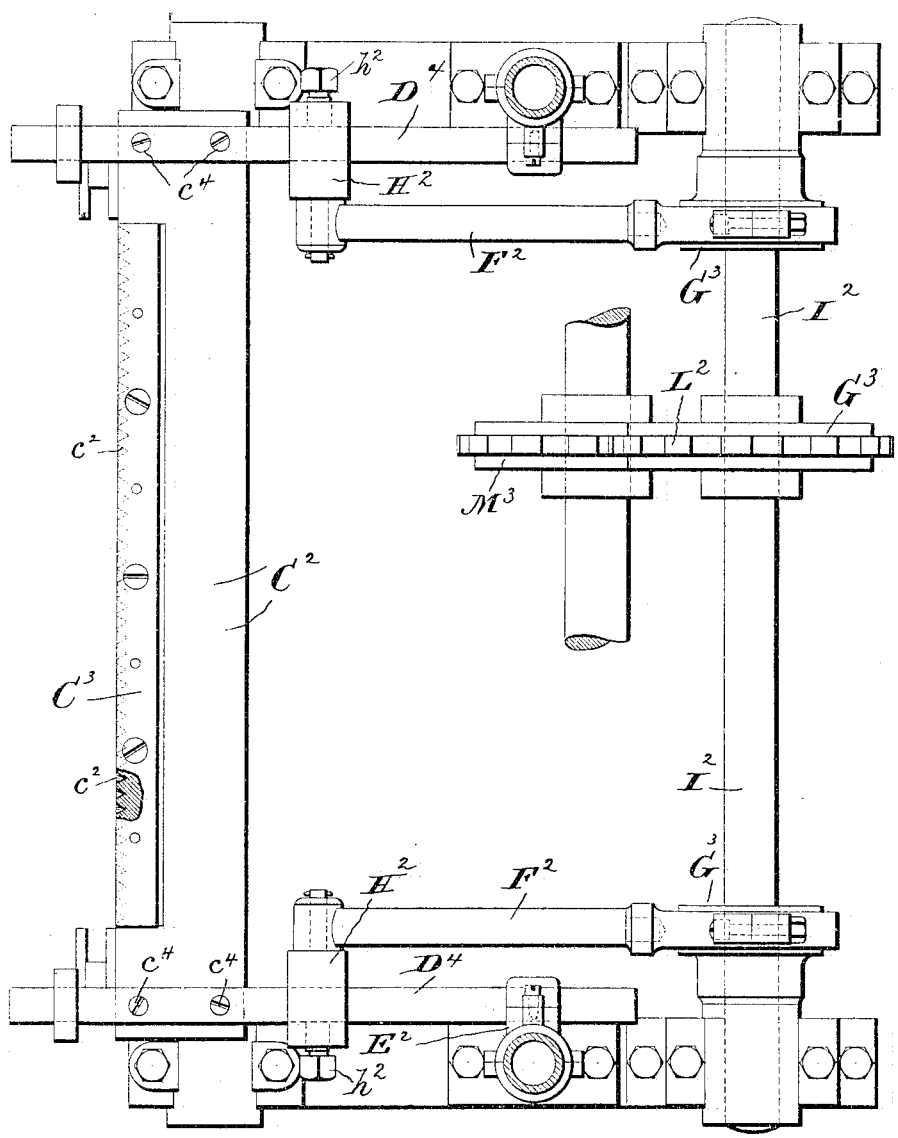

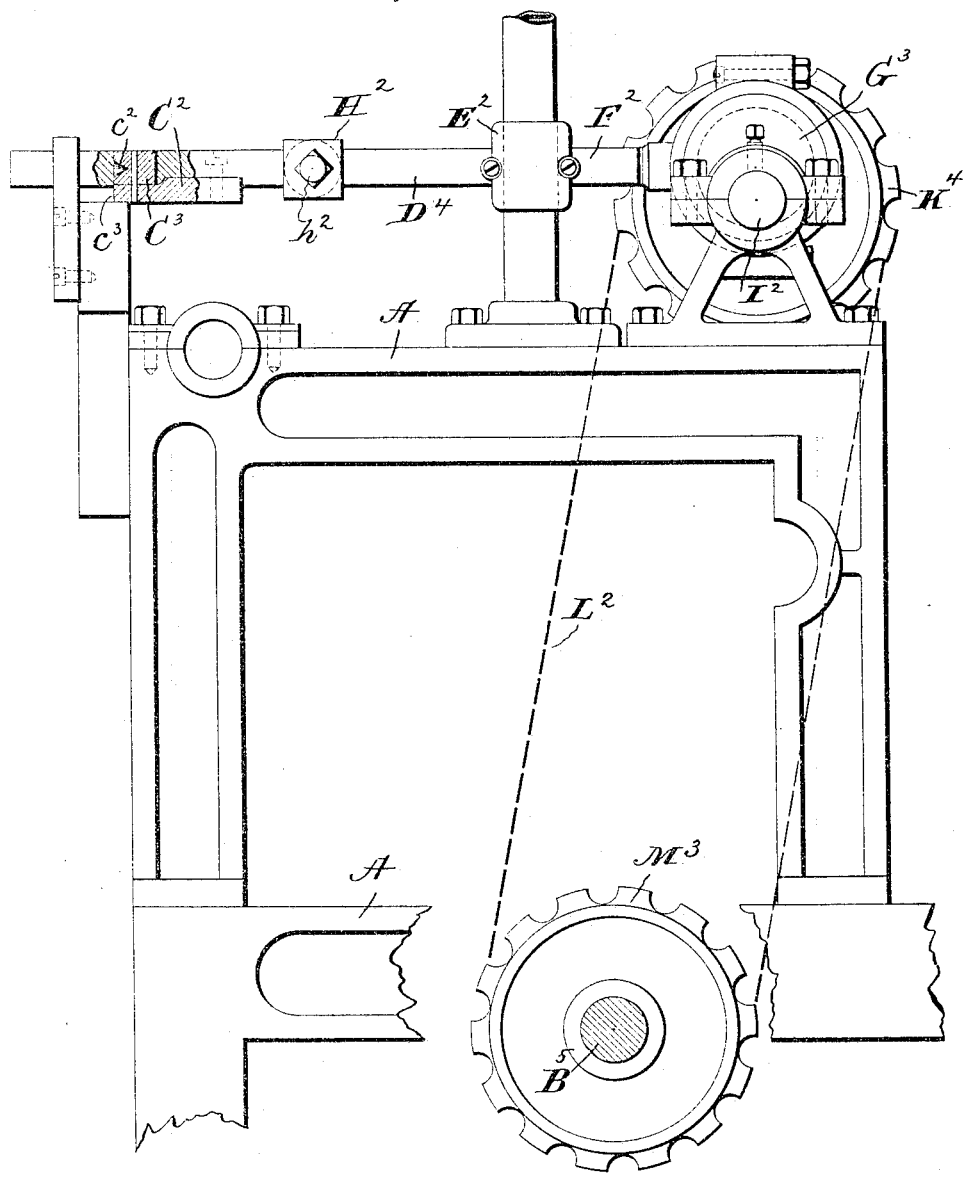

No. 766,567. Patented August 2, 1904.

UNITED STATES PATENT OFFICE.

JACOB P. WRIGHT, OF NEW HAVEN, CONNECTICUT, ASSIGNOR TO THE DIAMOND MATCH COMPANY, OF CHICAGO, ILLINOIS, A CORPORATION OF ILLINOIS.

MATCH-MAKING MACHINE.

SPECIFICATION forming part of Letters Patent No. 766,567, dated August 2, 1904.

Application filed December 31, 1897. Serial No. 664,973. (No model.)

*To all whom it may concern:*

Be it known that I, JACOB P. WRIGHT, of New Haven, in the county of New Haven and State of Connecticut, have invented certain new and useful Improvements in Match-Making Machines; and I do hereby declare that the following is a full, clear, and exact description thereof, reference being had to the accompanying drawings, in which—

Figure 1:
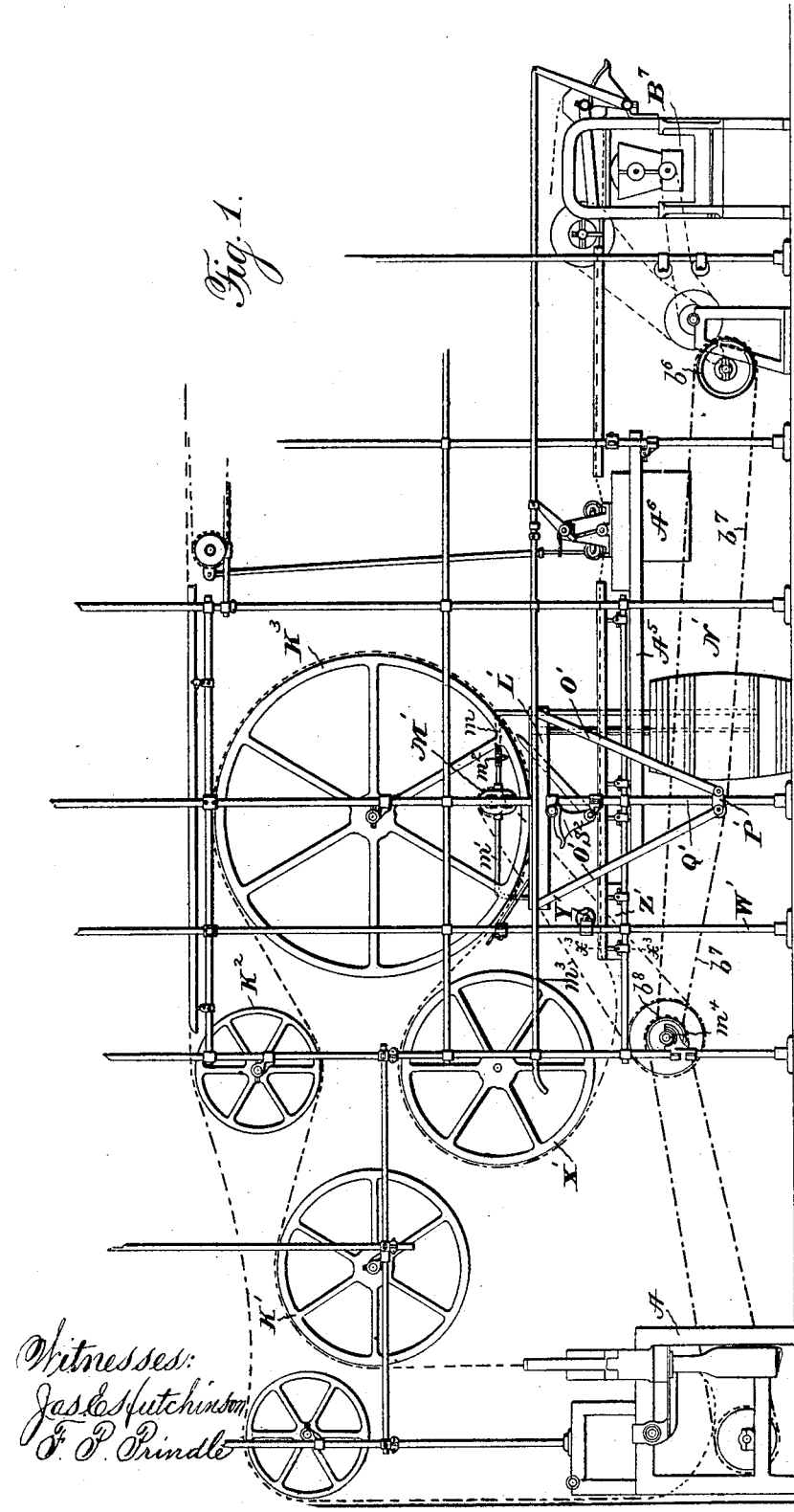
Figure 2:
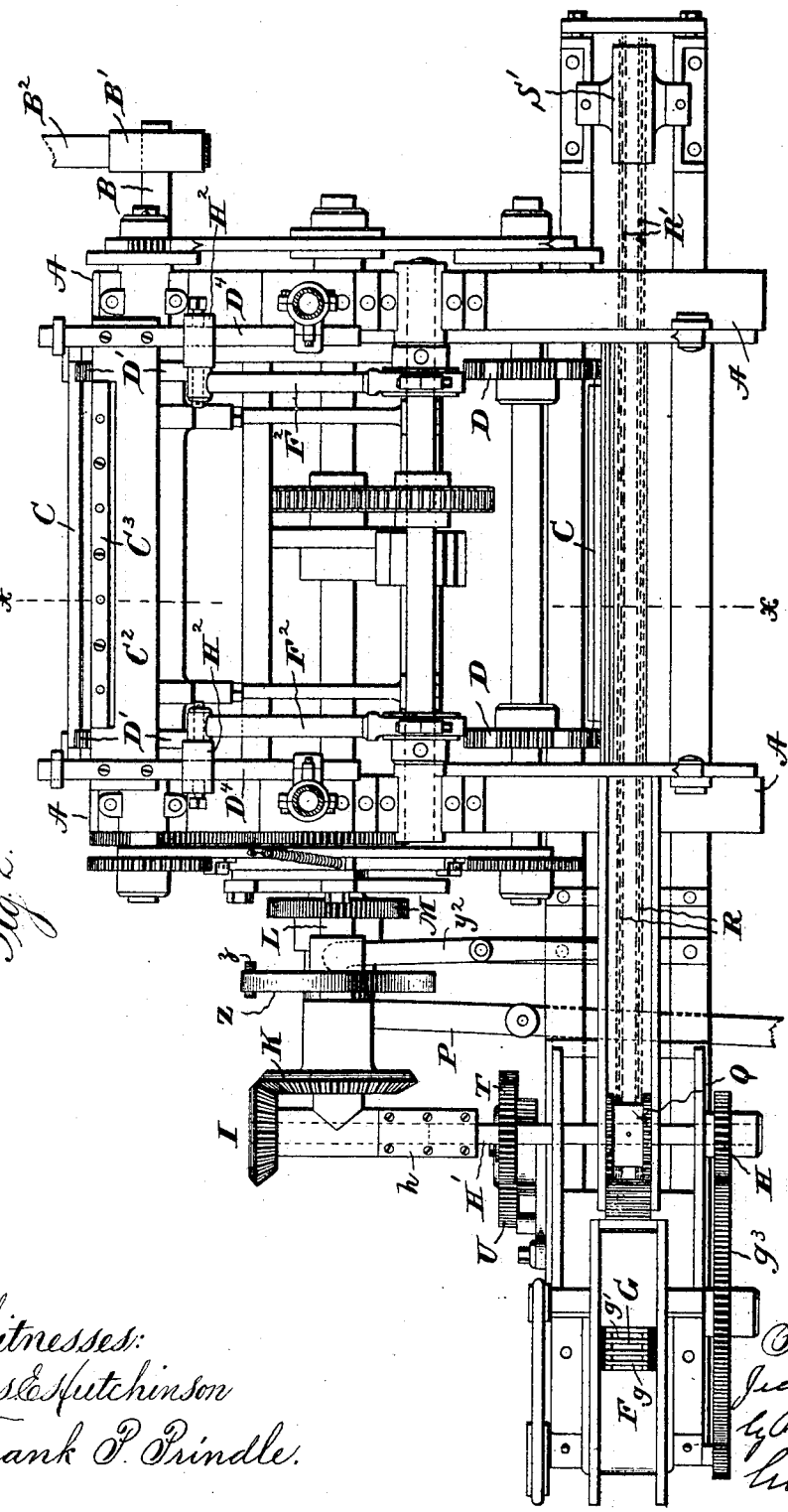
Figure 3:
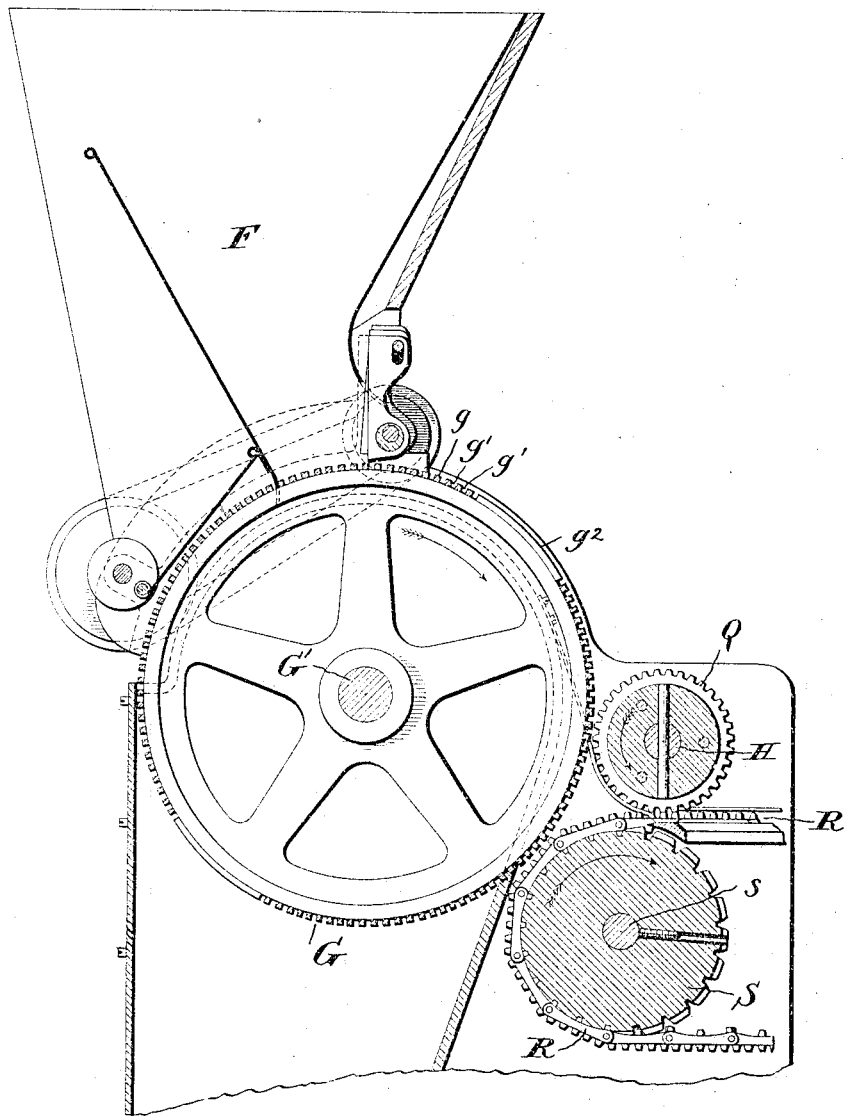
Figure 4:
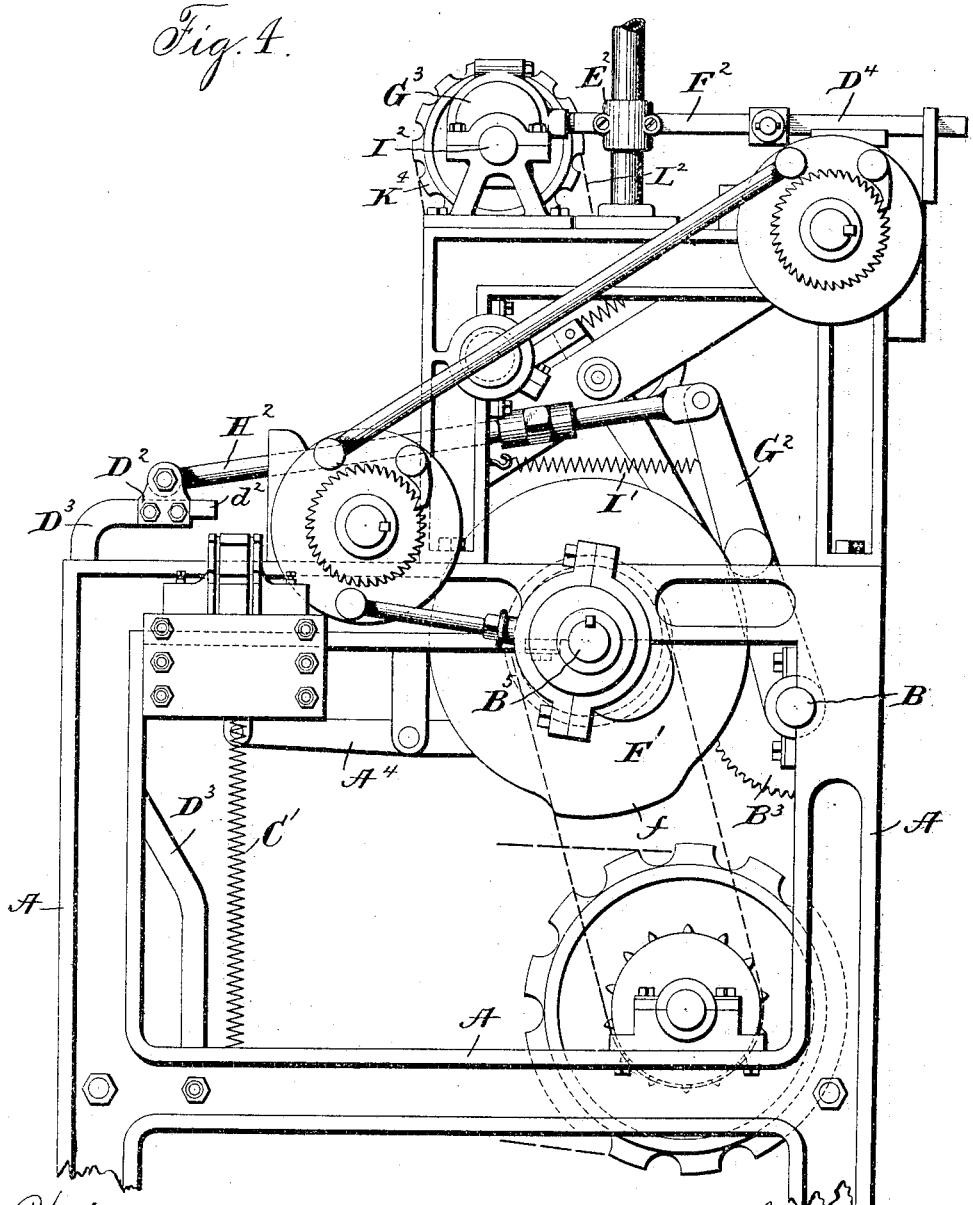
Figure 5:
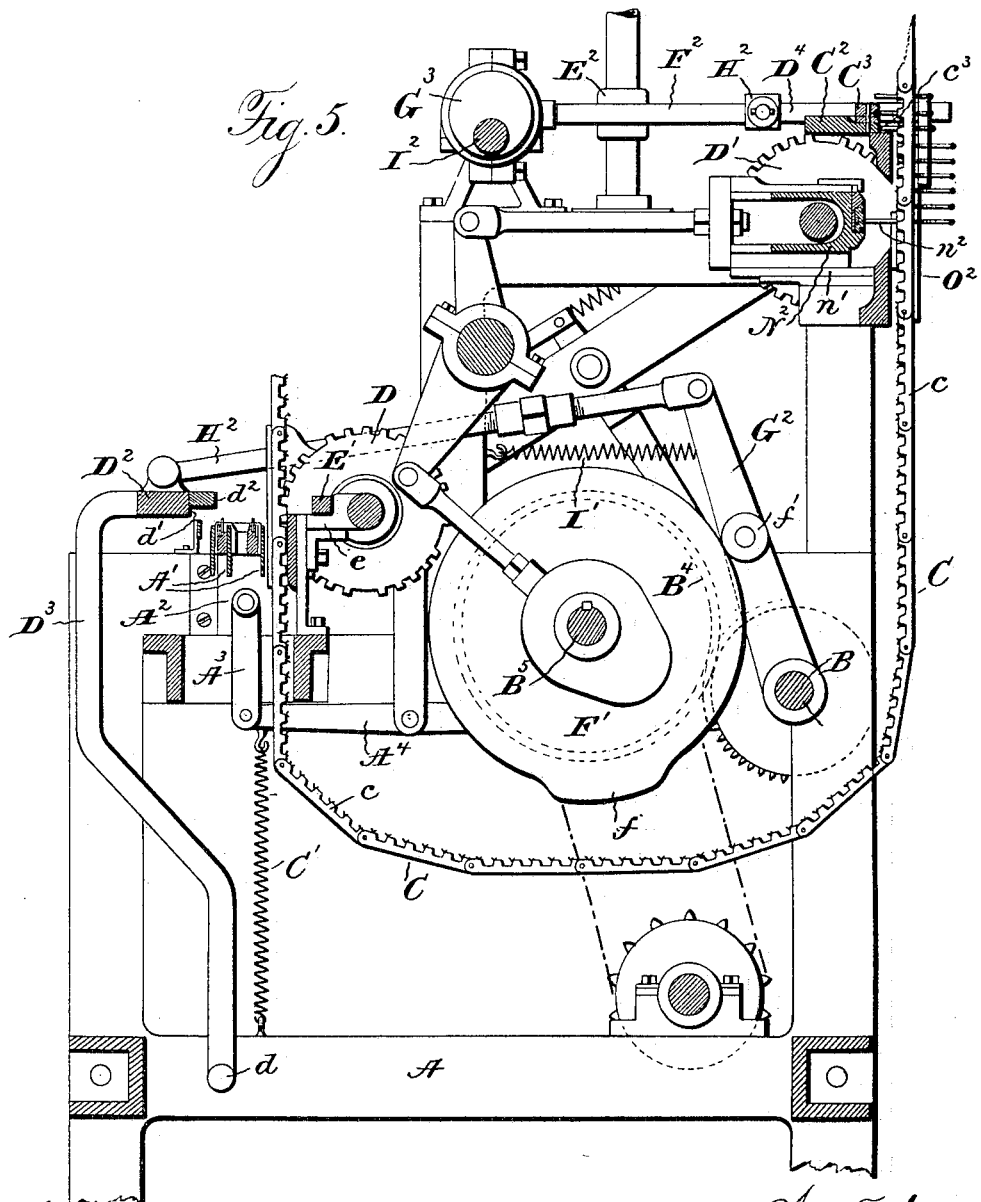
Figure 6:
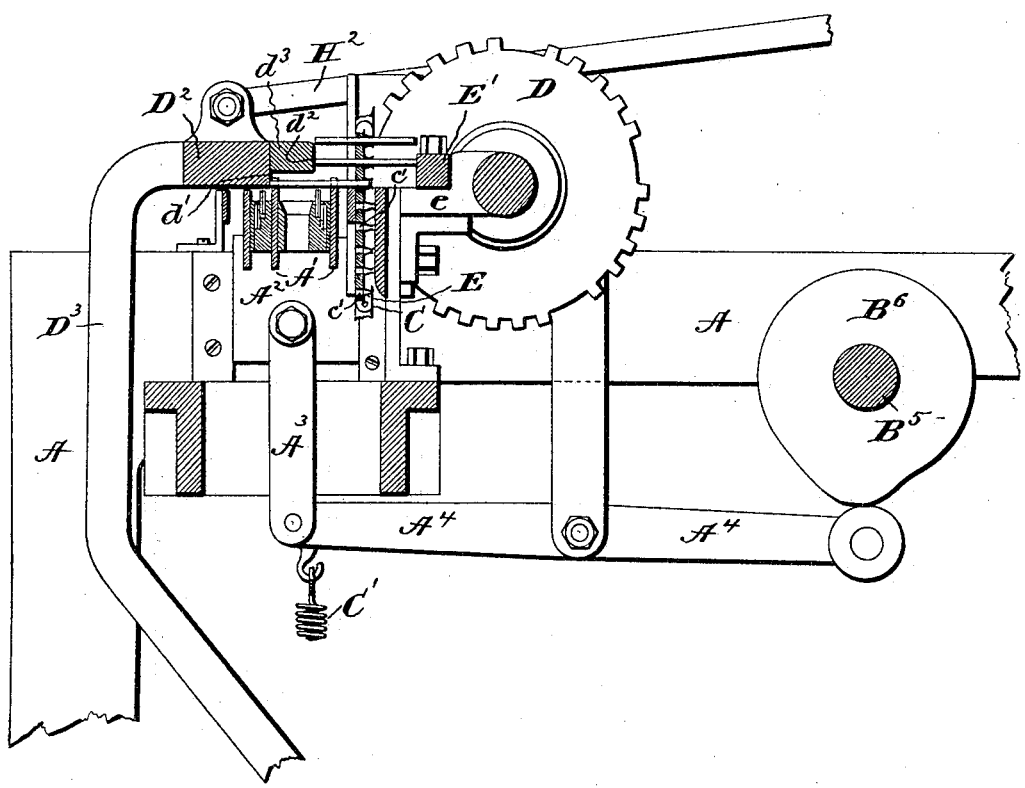

Figure 1 shows a diagrammatic view of my machine, showing a portion only of the series of wheels or pulleys for supporting the carrier-chain during the travel of the latter for drying and cooling the heads of the matches; Fig. 2, a plan view of the main part of the machine containing the means for feeding the splints and sticking them into the carrier-chain and discharging the completed matches from the latter, all of the carrier-chain except where it passes the splint-sticking devices being omitted, so that the operative parts of the mechanism may be shown clearly; Fig. 3, a vertical section, on an enlarged scale, showing the hopper and the means for taking splints therefrom and delivering them to the transfer-chains; Fig. 4, a view in side elevation of the part of the machine shown in Fig. 2, but with the transfer-chains, the hopper, and means for taking splints from the latter left off; Fig. 5, a view showing, on an enlarged scale, a vertical section on line $x\ x$ of Fig. 2; Fig. 6, a detail view, on an enlarged scale, showing, partly in side elevation and partly in section, the carrier-chain and means for placing the splints in position therein; Fig. 7, a detail plan view showing, on an enlarged scale, the mechanism for periodically locking the transfer-chain driving-roller; Fig. 8, a detail view showing a rear elevation of the mechanism as shown in Fig. 7; Fig. 9, a view of a section on the line $x^2\ x^2$ of Fig. 8; Fig. 10, a view of a section on line $y\ y$ of Fig. 7; Fig. 11, a detail view of a section on line $z\ z$ of Fig. 7; Fig. 12, a view of a section on line $x'\ x'$ of Fig. 11; Fig. 13, a detail sectional view, on an enlarged scale, showing in vertical section the means for securing the treatment of the match-splints to form the incombustible handles thereof; Fig. 14, a detail plan view showing, on an enlarged scale, the pan and drip-plate of the part of the machine shown in Fig. 13, but with the carrier-chain and the supporting-wheels for the latter removed; Fig. 15, a detail view in section on line $x^3\ x^3$ of Fig. 1; Fig. 16, a detail plan view showing, on an enlarged scale, the means for moving the splints in the carrier-chain into position to pass down in front of the ejecting devices; and Fig. 17, a detail view showing in side elevation the mechanism appearing in Fig. 16.

Letters of like name and kind refer to like parts in each of the figures.

The object of my invention has been to provide an improved machine for making matches; and to this end my invention consists in the machine and in the construction, arrangement, and combination of the parts thereof, as hereinafter specified.

The special purpose of my present invention has been to provide certain improvements upon the machine shown and described in United States Patent No. 586,890, granted upon an application filed by me, which will render such machine capable of employment for making "handle-matches" having portions treated so as to form incombustible handles and also to provide improved means for securing the desired intermittent travel of the transfer-chains used in such patented machine for conveying rows of splints into position in front of the carrier-chain. With the exception of the means for securing the intermittent travel of these transfer-chains I employ in the machine shown and to be described in the present application the same mechanism for supplying the splints and inserting them in the carrier-chain, the same carrier-chain and means for moving it step by step, the same paraffining and igniting composition-applying devices, and the same match ejecting or discharging mechanism as in the machine shown and described in the patent mentioned above. Such parts of the machine need not, then, be described at length herein. For a full detail showing and description of them, their construction, and working I refer to the drawings and specification of such patent.

In the drawings, A A designate the frame of the main part of the machine, which is of the same general shape as that of the machine of the above-cited patent.

Journaled in suitable bearings in frame A A is the main driving-shaft B, which is to be driven from any suitable motor or driver through any desired form of connections or gearing. As shown, it is provided with a belt-pulley B', which can be driven by a belt or band $B^2$, running from any power-driven band-wheel. On the driving-shaft, close to the pulley B', is a gear-wheel $B^3$, meshing with and driving a gear-wheel $B^4$, fixed on a shaft $B^5$ parallel with shaft B and, like it, journaled in bearings in the frame A A.

From the shaft $B^5$ power is taken to impart a step-by-step movement to a carrier-chain C, the mechanism for so operating said chain from the shaft being preferably the same as that clearly shown and fully described in the hereinbefore-mentioned patent.

The carrier-chain C, as shown herein and as I prefer, has the same construction as the chain shown in said patent, being composed of a series of plates hinged together and having each on one face two series of teeth $c$ and $c$ to mesh with the gear-wheels D D and D' and D', that form part of the above-mentioned mechanism for actuating the carrier-chain. Each of the plates is provided with transverse rows of splint-receiving perforations $c'$ and $c'$, preferably of such size as to inclose and engage the splints without compressing the same, and for each perforation there is a pair of spring splint-clamping fingers E and E, as is the case in the patent referred to, the clamps or fingers being preferably constructed as shown and described in said patent.

The splints to be supplied to the carrier-chain may be taken from any source of supply and be fed thereto by any desired mechanism. I, however, prefer as the source of supply a hopper F like that shown in Patent No. 586,890, which delivers the splints to a feed-drum G, also like that shown in said patent, and as the feed mechanism that to be presently described.

The feed-drum, which is mounted on a suitably-journaled shaft G', has its periphery formed of two separate series of parallel longitudinal ribs $g$ and $g$, having their opposite ends connected with the drum ends. The ribs of each series are separated from each other by a space just sufficient to allow a match-splint from the hopper to drop down easily between them, and the height of the ribs is equal to the thickness of one of the splints. The bottoms or inner sides of the spaces between ribs $g'$ $g'$ are left open, communicating with the space within the drum. The two series of ribs are separated from each other by broad blank spaces, and where these spaces are the ends of the drum have their edges provided with the raised portions $g^2$ $g^2$, extending circumferentially along them from a point near the end of one series of ribs $g'$ $g'$ nearly to the adjacent end of the other rib series. The height of these portions $g^2$ $g^2$ is such that their upper or outer sides travel in the same plane with the outer faces or sides of the ribs $g'$ $g'$ as the drum rotates. The spaces between the ends of the raised portions $g^2$ $g^2$ and the ends of the two series of ribs $g'$ $g'$ are of the same size as the spaces separating ribs $g'$ $g'$ and are adapted to receive portions of splints descending from the hopper into them. The number of ribs $g'$ $g'$ in each series should be such as to make the number of spaces between such ribs plus the two spaces between the ends of the series of ribs and the ends of the raised portions $g^2$ $g^2$ equal to the number of perforations in each row on the plates of the carrier-chain.

The means for agitating the splints in the hopper to cause their proper delivery to the drum G and the suction mechanism for causing the seating of the splints in the drum pockets or notches as shown in the patent referred to will preferably be used; but it has not been considered necessary to fully illustrate and describe the same herein.

A gear-wheel $g^3$, mounted on the drum-shaft G', being in mesh with and driven by a gear H on a suitably-supported shaft H', is the means by which the drum is revolved. Said shaft H' receives its motion by means of a bevel-gear I, that is secured to it, which is in mesh with a like gear K upon a shaft L, mounted in suitable bearings, and upon said shaft L is keyed a gear M, that meshes with a gear N, that is loosely journaled upon the shaft $B^5$, to which it may be clutched and unclutched. Thus through the gearing described the drum may be revolved from the shaft $B^5$, and the latter receives its motion from the main shaft B, and when the gear N is unclutched from the shaft $B^5$ the running of the main shaft will cause no revolution of the feed-drum.

The means for clutching and unclutching the gear N and its shaft $B^5$ may be of any preferred type. As shown, it consists of a sliding collar O, splined to the shaft, having several parallel pins $o$ and $o$, a second collar $o'$, pinned to the shaft, through openings in which the pins pass, and a hub $n$ on the wheel N, having an opening $n'$ for each pin $o$, into and out of which the pin is moved by the sliding of the collar. A lever P, having a pin or lug engaging an annular groove in the collar O, is provided, by means of which the collar and pins may be slid on the shaft.

The shaft H' is preferably formed of two parts united by a suitable coupling $h$ to facilitate the assemblage and taking down of the parts.

Mounted on the shaft H' is a transfer-drum

Q, constructed and arranged like the transfer-drum in the hereinbefore-referred-to patent, that receives the splints from the feed-drum G and passes them to pocketed transfer-chains R and R, by which they are carried into position to be placed in the carrier-chain C, said transfer-chains being supported by two rollers S and S', as in the patent referred to, the said transfer-chains differing from those of the patent only in that three teeth are employed on each link to engage notches in the rollers and the rollers being different only in respect to an increase in the number of tooth-engaging notches, because of the added teeth on the chain-links.

The roller S, which is the one near the transfer-drum Q, is driven from the shaft H', as in the machine of said patent, being given an intermittent movement by the following-described mechanism, which will be found to differ from that shown in the patent, viz: Mounted on the shaft H' is a gear T, which meshes with a larger gear U, that is mounted loosely on the hub $v$ of a ratchet-wheel V', that is keyed to the roller-shaft $s$, said gear U having pivoted to it a pawl W to engage the teeth of said ratchet-wheel, so as to cause the two, and thus the shaft $s$ and roller S, to revolve together. A cap $v'$, of larger diameter than the ratchet-wheel hub and secured to the latter by screws $v^2$ and $v^2$ engaging the outer side of the gear U, secures the latter on the hub.

It will be apparent that the revolution of the roller S depends on the engagement of the pawl W with the ratchet-wheel, and hence as these are disengaged there will be no movement of said roller, although the revolution of the gear U continues. Such stoppage of the revolution of the roller is to stop the travel of the transfer-chains to permit splints to be moved from the latter and placed in the carrier-chain, just as is the case in the machine of the prior patent. The pawl is held normally in engagement with a tooth of the ratchet by means of a spring $w$, that bears against a tail or prolongation $w'$ of the pawl, while to disengage the pawl there is placed in the path traveled by said tail a part $x$, against which said tail will strike, so that the pawl will be swung on its pivot out of engagement with the ratchet-wheel. The part $x$ is preferably in the form of a roller upon a pin $x'$, that is fastened to an arm X, that is pivoted on the shaft $s$, so as to be capable of such range of adjustment as to enable the point at which the pawl is disengaged to be adjusted. To hold the bar X in the position to which it may be set, a clamping-bolt $x^2$, passing through a segment-form slot $x^3$ in the bar, is provided. The duration of the disengagement of the pawl from the ratchet is preferably such that the pawl will skip two teeth of the ratchet. The interval of rest thus secured is required for the proper movement of splints from the transfer-chain to the carrier-chain in the manner and by the means to be presently described.

For locking the roller S during its period of rest, so as to hold the transfer-chains absolutely motionless and with their splint-carrying notches in position for the perfectly-accurate movement of the splints into the carrier-chain, the periphery of the feed-roller is provided with a series of parallel longitudinal notches $s^2$ and $s^2$, corresponding in number to and alining with the chain-engaging notches, one of which notches $s^2$ stops when the rotation of the roller is stopped in alinement with a sliding stop-bar Y, whose end is adapted to enter therein. Said bar is supported by and moves in guideways in two bars $y$ and $y$ and is pulled and held yieldingly out of engagement with a notch by means of a spring $y'$, attached at one end to said slide-bar and at its other end to one of the bars $y$. It is automatically moved into engagement with a notch at the instant the wheel is stopped and held in such engagement for the required time by means of a lever $y^2$, one end of which is pivotally attached to the slide-bar and the other end of which is in the path of a projection $z$, preferably in the form of a roller, carried by a disk Z upon the shaft L. The roller is placed within an opening that is cut through the disk near its periphery and is mounted on a pin $z'$, driven radially into the disk, the inner end of the pin being projected slightly into a hole $z^2$, cut through the disk at right angles to the axis of the pin to facilitate the removal of the pin and roller when necessary.

The rotation of the feed-drum G is so timed relatively to the period of rest of the transfer-chains that during such rest one of the blank spaces on the feed-drum will be moving by the transfer-drum, and thus no splints will be delivered to the latter.

The travel of the transfer-chains between the periods of rest is sufficient to carry a row of splints in position to be placed in the carrier-chain, the splints in which agree in number with the number of perforations in a row in said carrier-chain. For lifting the splints out of the notches of the carrier-chains into alinement with the perforations that are to receive them I employ two notched lifter-plates A' and A' like those shown and described in the previously-referred-to patent and similarly supported and actuated—that is to say, being attached to vertically-moving heads $A^2$ $A^2$—to each of which is connected, by a link $A^3$, a lever $A^4$, that is swung to move the head upward by means of a cam $B^6$ on the shaft $B^5$ and is swung to move the head downward by means of a suitably-arranged spring C'.

The upward movement of the lifter is such that it will bring any splints resting in the notches of its plates exactly opposite a row of perforations in one of the carrier-chain plates each time that such carrier-chain comes to rest and while it is held locked by the mechanism hereinbefore described.

To thrust the splints on the raised lifter into the carrier-plate perforations opposite them, I provide the beater-bar $D^2$, supported on the swinging arms $D^3 D^3$, pivoted at $d\ d$ to the frame A A, such bar being adapted as it is moved inward toward the lifter and the carrier-chain to engage the outer ends of the splints projecting from the lifter and drive the splints endwise into and through the perforations of the carrier-chain plate, so that the inner ends of the splints will pass between and be grasped by the spring-fingers E E on the back or inner side of the carrier-plate.

The beater-bar of the prior patent above referred to operates to drive the splints into the perforations only sufficiently far to place their ends within the grasp of the clamping-fingers E and E. In the present case, however, as the "handle" ends of the splints are to be treated to render them incombustible it is required that such ends be projected beyond the ends of the clamping-fingers to have them perfectly free therefrom and sufficiently exposed to enable the application thereto of the material rendering them incombustible. Preferably I cause the splints to project equal distances on both sides of the carrier-chain in readiness for the required treatment of both ends. To thus set the splints in the carrier-chain, the beater-bar $D^2$ is provided with two splint-engaging surfaces $d'$ and $d^2$, the former of which corresponds with the splint-engaging part of the beater-bar of said patented machine and moves the splints to the same extent, so that their ends are within the clamping-fingers, while the surface $d^2$ is nearer to the carrier-chain than the other by an amount equal to the amount of desired projection of the splints beyond said fingers. The two surfaces of the beater-bar act on the same row of splints in immediate succession; but of course they act simultaneously on two adjoining rows, so that while one row of splints is being moved from the lifter-plates into the perforations of the carrier-chain the immediately-preceding inserted row is being pushed farther through such perforations. As the surface $d^2$ is on a part in the form of a bar $d^3$ that overhangs the splints, as they are moved up by the lifter-plates said bar serves the same purpose as the guard-bar in the machine of the former patent, to keep the splints in the notches of said lifter-plates as they are being pushed therefrom into the carrier-chain perforations.

To insure that the splints when pushed to their final position by the surface $d^2$ shall be perfectly even, a stop-bar E' is provided, against the side of which the ends of the splints abut. Said bar is supported at each end from the frame A A by a suitable support $e$.

The splint-setting movement of the beater-bar $D^2$ is a quick one, caused by the action of the cam projections $f\ f$ of the two cam-wheels F' F', fixed on the shaft $B^5$ upon the bearings $f'\ f'$ on two levers $G^2 G^2$, pivoted to the opposite sides of frame A A at $g^4$. These levers are connected with the beater-bar by links $H^2 H^2$. Springs I' I', attached to the frame A A and to levers $G^2 G^2$, serve to throw the latter quickly forward to return the beater-bar to its normal retracted position when the projections $f\ f$ of the cam-wheels have passed the bearings on the levers. The beater-bar-actuating mechanism as shown and described herein is precisely like that of said prior patent.

The carrier-chain after leaving the place where the splints have been set therein, as described, passes upward to and over a pair of supporting and guiding wheels at K', thence beneath other like wheels at $K^2$, and thence to the top of a pair of large wheels at $K^3$, over which it passes to the bottom thereof, at which point it leaves the same. Directly beneath the wheels $K^3$ is placed a shallow pan L' to contain in liquid form some suitable material which when applied to the splints will render the portions treated incombustible and through which the portions of the splints to form the handles are passed as the carrier-chain is carried along on the under sides of said wheels. Said liquid may be supplied to the pan in any preferred way; but it is desirable that it should flow or circulate through the pan. A pump M'—as shown, a rotary one—is therefore employed that during the operation of the machine may work continuously and which is connected by a pipe $m$ with a tank or other receptacle N' containing the liquid, and delivers the latter taken from the tank through a pipe $m'$ to the pan. From the pan the liquid passes through an outlet-pipe $l'$, entering the bottom of the pan, back to tank N'. To regulate the level of the liquid in the pan and prevent overflow, an overflow-pipe $l^2$ is provided that enters the side of the pan at the desired level and extends into the tank N'. A valve or cock $m^2$ is placed in the pipe $m$ to regulate the flow from the tank to the pump.

The pump M' may be supported in any suitable way, as by being bolted or fastened to the customary framework standards or uprights. For operating it I connect a sprocket-wheel on its shaft by a chain $m^3$, with a sprocket-wheel $M^2$ on a shaft $m^4$, that is driven by suitable sprocket-gearing from the shaft $B^5$.

Attached to the pan L' on each side are the upper ends of two bars O' and O', that thence extend downward, converging toward each other, and being attached at their lower ends to the opposite sides of a sleeve P' upon the upright or standard Q'. Secured to the bottom of the pan by loops $l^3$ and $l^3$ is a cross-bar R', that at its opposite ends passes through openings or eyes $q'$ and $q'$ on sleeves $q^2$ and $q^2$, that are respectively on the two standards Q' and Q'. On each end just beyond the eye $q'$ the bar has a small roller $r$, that rests upon the upper curved edge of a segment-shaped plate $S^2$, that is attached at its lower end to a rockshaft $T'$, that is journaled in brackets $q^3$ and $q^3$, rigidly fastened to the uprights $Q'$ and $Q'$. At each extremity the plate $S^2$ has an upturned lip $s'$ to prevent its passing out of engagement with its roller, and near one extremity it has a depression $s^2$, into which the roller may drop when the plate is swung to place such depression beneath the roller. As the sleeves $q$ and $q^2$ are slidingly mounted on the uprights, it will be seen that by the swinging of the plates $S^2$ and $S^2$ in one direction the pan may be lowered to remove its contents out of the path of match-splints, while by the swinging of said plates in the opposite direction the pan will be raised to such position as to place its contents in the path of the splints. A hand-lever $U'$, applied to the rockshaft $T'$, is provided to enable the described lowering and raising of the pan at will. After leaving the liquid in the pan $L'$ the ends of the splints are carried into contact with and passed along an inclined plate $V^2$ to take off any drops of liquid that may adhere to them, the lower end of the plate being over the pan, so that the drippings may run back into the latter. Said plate $V^2$ is attached by brackets $v^3$ and $v^3$ to uprights $W'$, a cross-bar $v^4$ being secured to its under side by clamps $v^5 v^5$, the ends of which bar enter openings in said brackets. The splints are now ready to be subjected to the usual dipping treatment; but as the handle ends project downward it is necessary that the splints should be inverted. From the drop-removing plate the carrier-chain is therefore carried to the top of a pair of wheels at $X'$, over half of which it is carried, leaving the same at the lower side with the splints thus reversed. From said wheels the carrier-chain travels to and beneath an evener-roll $Y'$, so that the upper ends of the splints will be engaged thereby and the splints pressed downward and the whole line made even. The evener-roll is journaled in brackets on the uprights $W'$ and $W'$ and has a longitudinally fluted or corrugated periphery. (See Fig. 15.) To support the carrier-chain against the downward thrust of the roll upon the splints, a plate $Z'$ is placed beneath the carrier-chain with its upper edge engaging the chain at its transverse center. A pair of parallel rods $z^3 z^3$, passing, respectively, through openings in said plate $Z'$ and attached at their ends to supporting-bars $Z^2 Z^2$, support the plate $Z'$ in its described position. Around each opening in the plate, through which a rod $z^3$ passes, is a collar $z^4$, through which passes a set-screw $z^5$ to fasten the plate to the bar. From the evening-roll the carrier-chain passes over a heater $A^5$ and thence to a paraffin-applying device $A^6$, where portions of the splints are to be treated with paraffin. Beyond this device the carrier-chain moves the splints to and past mechanism $B^7$ for applying the head-forming composition.

The splint-heating, paraffining, and composition-applying devices can be of any desired construction and need not be described in detail in the present application, as their construction can be varied, as desired, without involving any departure from the invention forming the subject-matter of the claims of this application. As these devices are indicated in the drawings they are of the same relative arrangement and can be of the same construction as the corresponding devices or mechanisms shown and described in the prior United States Patent, No. 586,890.

The composition-applying mechanism may be actuated by a sprocket-wheel $b^6$, connected by a chain $b^7$ with a sprocket-wheel $b^8$ on the shaft $m^4$. From the composition-applying mechanism the carrier-chain passes over wheels and guides which may be like those in said prior patent, No. 586,890, to afford time for the composition forming the heads to cool, dry, and harden before the matches are discharged from the carrier-chain and is finally brought to the match-discharging mechanism which, as shown, is the same in construction as that in said Patent No. 586,890. As said discharging mechanism operates when the ends of the splints only are in the spring-clamping fingers and, as in the present machine, the handle part of the matches project beyond these fingers, it is necessary to place the matches in the carrier-chain in position to be acted on by said discharging mechanism. For this purpose I employ a pusher-plate $C^2$, placed just above the discharging mechanism, having such length that its front side can engage an entire row of matches. Said pusher-plate has in it a tapering hole $c^2$ for each match to receive the end of the match, and if the same be awry or inclined to one side of its proper position to guide or bring the match into proper position. As the entrance of the matches into the openings results in their not being pushed the required distance through the carrier-chain, the plate below the line of holes has a smooth plane surface $c^3$ to engage the ends of the matches and complete their movement to the required distance. It will be understood, of course, that the holes $c^2$ and surface $c^3$ act in immediate sequence on the same row of splints and that two rows of splints are acted on simultaneously. As shown, the openings $c^2$ are provided in a bar $C^3$—that is, made separate from the plate $C^2$—and fastened thereto by screws and dowel-pins. The plate $C^2$ is fastened, as by screws $c^4$ and $c^4$, to the under side of a pair of parallel bars $D^4$ and $D^4$, that are respectively slidingly mounted in guides $E^2$ and $E^2$, supported on the frame A A. Attached to each bar $D^4$ by a pitman $F^2$ is an eccentric $G^3$, by the revolution of which the bar is moved to and from the carrier-chain to cause the pusher-plate $C^2$ to engage the ends of the matches and move the latter through the carrier-chain to the desired position and then be retracted. The connection between the bar and pitman is preferably an adjustable one to enable the position of the pusher-plate to be adjusted and, as shown, consists of a slotted block H² on the bar, having a set-screw h² to engage the side of the bar, to which block the pitman is pivoted. The eccentrics G³ and G³ are mounted on a shaft I², journaled in suitable bearings on the frame A A and having on it a sprocket-wheel K⁴, that is connected by a chain L² to a like wheel M³ on the shaft B⁵.

The match-discharging mechanism, which, as shown, is, as stated above, the same as that of the machine of Patent No. 586,890, consists of a reciprocating head N², supported on guides n' n', so as to be movable toward and from the back of the carrier-chain plate held between the wheels D' D' and guides O² O², its movement being in a plane at right angles to such plate. This head carries a series of punch-pins n² n², of the same number as the perforations e e, in a row on the carrier-chain plates, the pins being so situated on the head that each one will be opposite one of the plate-perforations when the carrier-chain has come to rest and is held from movement. The movements of the head N² are effected by means of a cam on the shaft B⁵, acting through suitable connections, as shown, for full description of which reference is made to said patent.

The liquid used in pan L' for treating portions of the match-splints to render them incombustible can be a solution of any suitable chemical—as, for instance, silicate of soda, silicate of potash, or sulfate of ammonia.

Having thus described my invention, what I claim is—

1. In a machine for making "handle-matches," the combination of a traveling carrier having provisions to hold splints in succeeding rows which extend transversely of the carrier with the ends of the splints projecting beyond the respective sides of the carrier, and plural substance-applying means located at different points along the path of travel of such projecting ends, whereby two different substances, one ignitible and the other non-ignitible—may be applied to the respective ends of the splints in said rows during the traverse of the carrier, substantially as described.

2. In a machine for making "handle-matches," the combination of a traveling splint-carrier having provisions to hold splints in succeeding rows which extend transversely of the carrier with the ends of the splints projecting beyond the upper and lower sides respectively of the carrier, plural substance-applying means located at different points along the path of travel of such projecting ends, and means whereby the carrier is reversed during its traverse to cause the respective ends of the splints in said rows to extend downward when the substances are being applied thereto, substantially as described.

3. In a machine for making "handle-matches," the combination of a traveling splint-carrier, means for inserting rows of splints therein transversely of the carrier, means for causing the ends of the splints to project beyond both sides of the carrier, plural substance-applying means located at different points along the path of travel of such projecting ends, and means whereby the carrier is reversed during its traverse to cause the respective ends of the splints in said rows to extend downward when the substances are being applied thereto, substantially as described.

4. In a machine for making "handle-matches," the combination of a traveling carrier having provisions to hold splints in succeeding rows which extend transversely of the carrier with the ends of the splints projecting beyond the respective sides of the carrier, a splint-evening device in the path of the splints in the carrier, and plural substance-applying means located at different points along the path of travel of such projecting ends whereby two different substances—one ignitible and the other non-ignitible—may be applied to the respective ends of the splints in said rows during the traverse of the carrier, substantially as described.

5. In a machine for making "handle-matches," the combination of a traveling splint-carrier, means for inserting rows of splints therein, means for causing the ends of the splints to project beyond both sides of the carrier, two substance-applying means located at different points along the path of travel of such projecting ends, and a splint-evening device located in the path of the splints at a point between the two substance-applying means, substantially as described.

6. In a machine for making "handle-matches," the combination of a traveling splint-carrier having provisions to hold splints in succeeding rows which extend transversely of the carrier, with the ends of the splints projecting beyond the respective sides of the carrier, plural substance-applying means located at different points along the path of travel of such projecting ends and in different horizontal planes, and means whereby the carrier is guided during its traverse to cause the respective ends of the splints in said rows to be presented to the respective substance-applying means during the traverse of the carrier, substantially as described.

7. In a match-machine, the combination of a splint-carrier, a receptacle for liquid for treating the splints, and a flat surface extending transversely of the carrier and immediately beneath the depending extremities of the splints after they leave said receptacle, which surface is adapted to remove pendent globules of liquid from such extremities, substantially as described.

8. In a match-machine, the combination of a splint-carrier, a receptacle for liquid adapted to render parts of splints incombustible, an inclined surface leading to said receptacle, past which the ends of the splints are moved after leaving said receptacle adapted to remove drops of liquid from the splints, substantially as described.

9. In a match-machine, the combination of a splint-carrier, a receptacle for liquid for treating the splints, an inclined surface leading to said receptacle past which the ends of the splints are moved after leaving said receptacle adapted to remove drops of liquid from the splints, and means whereby the angle of said plate may be adjusted in respect to the path of the splint ends, substantially as described.

10. In a match-machine, the combination of a splint-holder having splint-receiving openings, a source of supply of splints, means for moving the splints from the latter so as to insert them into said openings, and means for subsequently forcing the splints through said openings so that they will project beyond the openings on the side of the carrier opposite that at which they entered the openings, substantially as described.

11. The combination of a source of supply of splints, a splint-holder having splint-receiving openings, and a beater-bar having splint-engaging surfaces at different distances from the holder, one of which surfaces moves splints from the source of supply into said openings, and the other changes their position therein, substantially as described.

12. The combination of a source of supply of splints, a splint-holder having splint-receiving openings, a beater-bar having splint-engaging surfaces at different distances from the holder, one of which surfaces moves splints from the source of supply into said openings and the other changes their position therein, and a splint-engaging stop on the side of the holder opposite the beater-bar, substantially as described.

13. The combination of a splint-carrier having splint-holding openings, a second carrier, and a beater-bar, two splint-engaging surfaces in different planes, one of which moves splints from one carrier to the other, and the other of which changes the position of the splints therein, substantially as described.

14. In a match-machine, the combination of a splint-carrier having series of splint-holding devices, means for inserting splints in such carrier so that they will project on opposite sides of the same, means for treating both ends of the splints, an ejecting device for ejecting the splints from the carrier, and means for moving the splints through the carrier before they reach the ejecting device, said last-named means being arranged to move the splints so that their ends on the same side of the carrier as the ejecting device will be close to or flush with such side of the carrier when they come opposite the ejecting device, substantially as described.

15. In a match-machine, in combination with a splint-carrier having a series of splint-holding devices, means for inserting splints from a source of supply into such carrier, a composition-applying device to apply the head-making compound to the splints, an ejecting device to eject the splints from the carrier, and a pusher operating on the same side of the carrier as the ejecting device, to engage the splints projecting beyond such side and move them to bring their ends to or near such side of the carrier before the splints reach the ejecting device, such pusher being situated so as to operate upon the splints at a point in the travel of the carrier between the composition-applying device and the ejecting device, substantially as described.

16. The combination of a splint-holder having splint-receiving openings, a bar movable to and from said holder, having an opening for each splint, with inclined edges to engage the splint end, substantially as described.

17. The combination of a splint-holder having splint-receiving openings, a bar movable to and from said holder, having an opening for each splint, with inclined sides to engage the splint end and having a plane surface to engage the splint end, substantially as described.

18. The combination of a splint-holder having splint-receiving openings, a bar movable to and from said holder, having an opening for each splint, with inclined sides to engage the splint end, and having a plane surface to engage such end, and a splint-ejecting mechanism, substantially as described.

19. In a match-machine, the combination of a source of supply of splints, a traveling splint-carrier having splint-receiving holes, means for placing splints in the latter whereby they will project on both sides of the carrier, a pan for liquid to render parts of the splints incombustible, arranged in the path of the ends of the splints on one side of the carrier, as they travel with the carrier, means for inverting the carrier, a splint-evening device, means for applying an igniting substance to the other ends of the splints, means for moving the splints partially through the carrier-holes, and an ejector mechanism, said last-named means being situated between the means for applying an igniting substance and the ejector mechanism, substantially as described.

In testimony that I claim the foregoing I have hereunto set my hand this 29th day of December, A. D. 1897.

JACOB P. WRIGHT.

Witnesses:
H. DAYTON STANNARD,
L. W. BEECHER.